Figure 1:
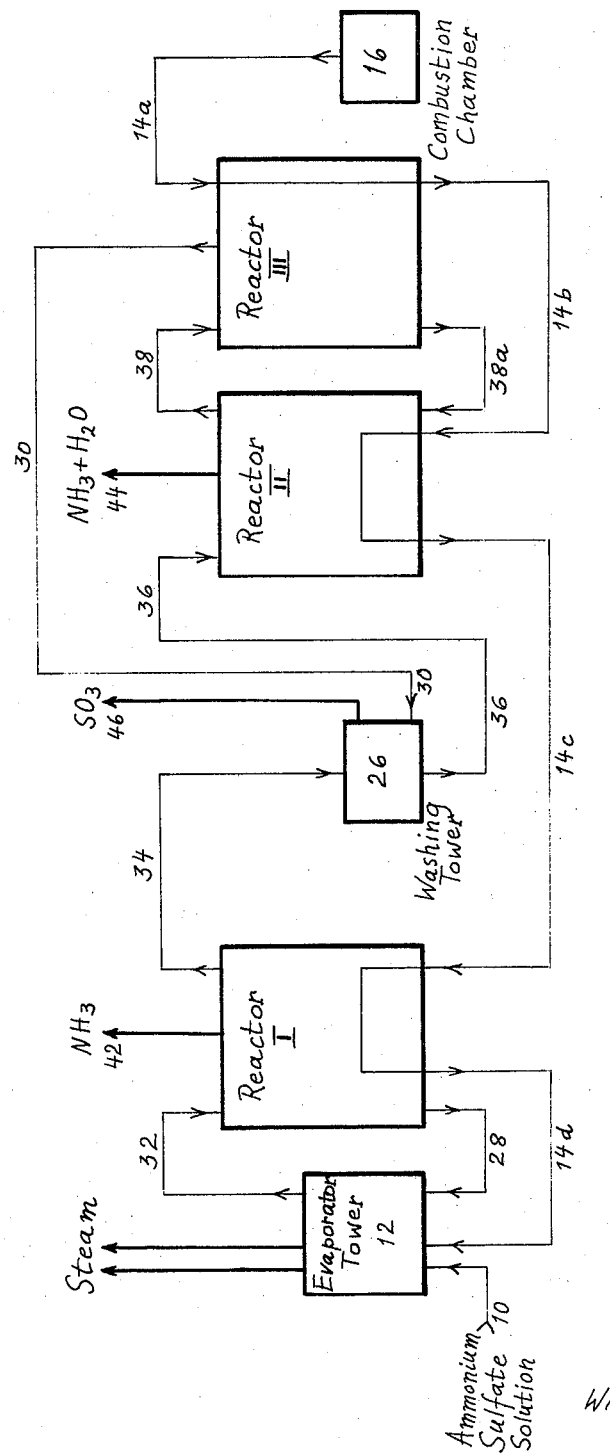

INVENTOR:
Wilhelm Deiters

INVENTOR:
Wilhelm Deiters

United States Patent Office 3,243,261
Patented Mar. 29, 1966

3,243,261
PROCESS FOR OBTAINING AMMONIA AND SULFUR OXIDES FROM AMMONIUM SULFATE LIQUORS
Wilhelm Deiters, Chur, Switzerland, assignor to Inventa A.G. für Forschung und Patentverwertung, Zurich, Switzerland
Filed Sept. 3, 1963, Ser. No. 306,230
Claims priority, application Switzerland, Sept. 11, 1962, 10,757/62
6 Claims. (Cl. 23—174)

The present invention relates to the recovery of ammonia and sulfur oxides from ammonium sulfate liquors.

In some industrial processes ammonium sulfate-containing liquors are obtained as by-products which up to now were utilized for making fertilizers therefrom. However, it appeared that other uses may be more promising. Studies and patent applications resulted from the endeavors to recover from the above-mentioned liquors the component parts, namely ammonia and sulfur oxides.

There are basically two ways of realizing the above-mentioned aims. The one is to link the acid ion to a stronger base, e.g. iron oxide, thereby forming a stable salt which permits the ammonia to be driven off. According to the other method, the ammonium ion is converted into a stable salt, e.g. by combination with phosphoric acid, whereby sulfur trioxide is set free. Each of these processes requires a second step in which the combined ion has to be recovered, for instance, by thermic decomposition.

The first mentioned procedure, namely the intermediary production of a metal sulfate from which sulfur trioxide is obtained by thermic decomposition has obvious technical difficulties and is faced with the disadvantage that the splitting operations for $NH_3$ and $SO_3$ cannot be properly held apart; in other words, pure products cannot be obtained at technically feasible reaction conditions.

A somewhat better solution of the problem is mentioned in British Patent 124,842. The patent deals with the recovery of sulfuric acid from gypsum and suggests the following method for splitting the ammonium sulfate obtained as an intermediary product. The entire $NH_3$ is liberated by reaction with sodium sulfate at elevated temperature. The sodium bisulfate formed thereby has to be heated subsequently in order to liberate $SO_3$ while sodium sulfate is formed once more.

The object of the present invention is to provide an improved process for the production of ammonia and sulfur oxides, primarily sulfur trioxide, from ammonium sulfate liquors which simplifies the known methods and leads to pure compounds in a simple and inexpensive process.

The invention permits to obtain this object by using crude ammonium sulfate liquor as a starting material and working it up in a continuous process.

In carrying out the process according to the invention, the reactions which lead to the splitting into ammonia and sulfur oxides are effected in different circulating salt melts, which serve as solvents for the reactants. For instance, about 50% of ammonia can be split off in a melt of ammonium bisulfate, after the water from the ammonium sulfate liquor has been evaporated, whereas the further conversion of a separated portion of the liquor to form sodium-bisulfate, pyrosulfate, sodium sulfate and sulfur oxides is carried out in a melt of sodium pyrosulfate. In any case, the sodium sulfate formed is returned into a suitable stage of the process, in the sequence of operations here mentioned, into the pyrosulfate melt.

The necessary energy is supplied by a combustion chamber, the heat contained in the waste gases being utilized in the process in a counter current principle.

Figure 2:
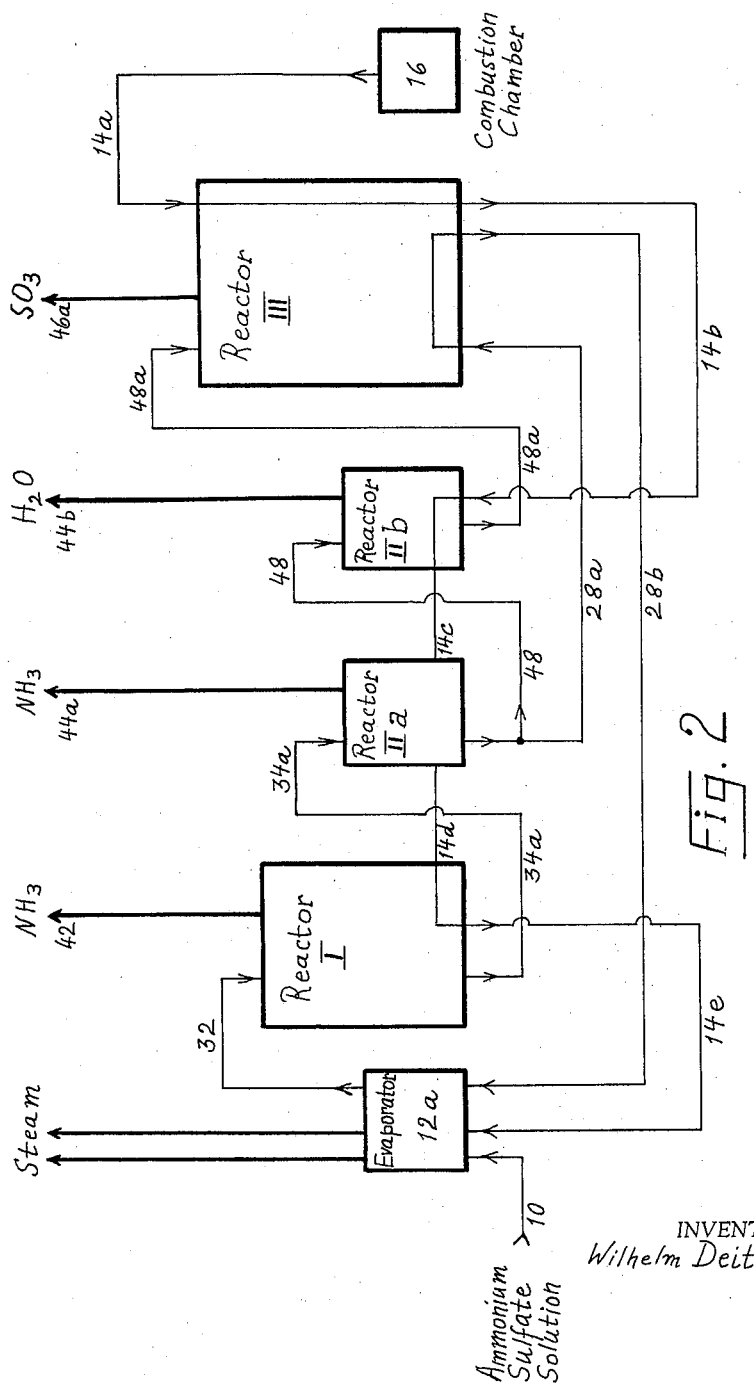

In the accompanying drawings: FIGS. 1 and 2 illustrate schematically two embodiments of a system to be used in practice for carrying out the process according to the invention.

In the system shown in FIG. 1 the process is carried out continuously by circulating a melt of ammonium bisulfate, in which the amount of ammonium sulfate to be worked up is dissolved continuously and is converted into ammonium bisulfate by splitting off ammonia by appropriate temperature increase.

In FIG. 1, a pipeline 10 is provided for supply of ammonium sulfate solution to an evaporator tower 12. The heating system comprises pipelines 14a to 14d, which are leading from a combustion chamber 16 and are carrying combustion gases through various parts of the apparatus, to be described hereunder in detail.

The conversion of ammonium sulfate occurs in reactors I, II, and III, in a manner fully described in the example hereinbelow. Pipes 32, 34, 36, and 38 are provided for conveying the reaction liquids and melts from one reactor to the other. Conduits 42, 44, and 46, serve for recovery of $NH_3$ and $SO_3$ respectively; 26 is a washing tower or scrubber.

FIG. 2 shows a somewhat modified system of reactors and piping and will be explained as the description proceeds.

One method of operation will now be described more fully with reference to FIG. 1.

An aqueous solution of ammonium sulfate is introduced through pipeline 10 into the bottom of evaporator tower 12, preferably under pressure and preheated to a temperature of about 200° C. It meets an ammonium bisulfate melt which is supplied from the reactor I, by way of pipe 28, and which passes through the tower 12 in upward direction from bottom to top. The suddenly released amount of steam has the action of a mammoth pump and it substitutes a conveyor system effecting circulation. The necessary heat is supplied to the tower, if desired, by indirect heating, but preferably by the combustion gases from chamber 16 by way of the pipeline system 14a to 14d as mentioned above. If necessary, heat can be supplied simultaneously by direct and indirect means.

Tower 12 can either be in the form of a simple conduit or consist of a bundle of tubes with a gas escape chamber on top. In another embodiment, it may consist of a plurality of concentric tubes, in which case in the outer tube a portion of the product thrust upwardly by the action of the gas lift pump, will flow back into a suction nozzle at the bottom. The dehydrated ammonium sulfate passes from the top of tower 12, over pipe 32 into the reactor I; there it is heated up to a temperature of about 300° C. by indirect heating through pipe 14c, the rise in temperature being brought about by a proper period of stay; as a consequence of the high temperature, 50% by weight of ammonia are split off and are discharged through conduit 42. The ammonia may alternatively be liberated by direct treatment with overheated steam or with a gas of suitable temperature, which must be free of acid components. Generally, however, it will be desirable to recover the ammonia in as concentrated a form as possible. While ammonia is split off, ammonium sulfate is converted into ammonium bisulfate.

While the largest part of ammonium bisulfate is returned from reactor I, over pipe 28 into tower 12, that portion which corresponds to converted ammonium sulfate, is withdrawn over pipe 34 from the first cycle for further splitting off of ammonia and conveyed to reactor II. Thereby, the molten ammonium bisulfate arrives at the second cycle in which as carrier medium a second salt melt is circulated, namely: sodiumpyrosulfate having a temperature above 500° C. In this cycle, in which the two reactors II and III are connected by pipes 38 and 38a, continuous circulation may likewise be maintained by a mammoth pipe-like arrangement—that is to say, either gas obtained from the production itself, or an additional gas thrusts the melt upward in one of the two reactors, II, III, so that it will be capable of returning through the other reactor.

In the reactor II, the remaining ammonia is split off from ammonium bisulfate and withdrawn over pipe 44. To that end, it is reacted with sodium sulfate with further increase of temperature which results in escape of $NH_3$ with sodium bisulfate formation. Heating can be done by indirect heat supply through pipe 14b, but in this stage, too, superheated steam or a suitable auxiliary gas can be used if it can be combined with the conditions for obtaining the split off ammonia.

It would be possible to introduce the sodium sulfate either as solid salt or in aqueous solution into the reactor II. However, since this salt is regenerated in the further course of the process, for the sake of continuous operation it is advantageous to use sodium pyrosulfate as medium for the return of the sodium sulfate, since all the reaction components are soluble in the pyrosulfate.

Upon further heating to about 500° C., the sodium bisulfate, obtained in the reactor II, is converted into sodium pyrosulfate, while water is split off, so that a pure melt of pyrosulfate will pass into reactor III, over pipe 38.

If no particular precaution is taken, the second half of the ammonia is obtained together with part of the reaction water. Since it is sometimes desirable to recover in separate fractions anhydrous ammonia or ammonia poor in water, the reaction stage in II can be so conducted that the separate fractions can be recovered at gradually rising temperatures.

In the reactor III, that portion of the pyrosulfate should be split continuously, at temperatures up to about 900° C., which corresponds to the ammonium sulfate that is introduced.

In the following, two different embodiments of carrying out the return phase in this thermal process will be described under A and B.

In case A, only the portion of the pyrosulfate which is to be split is separated from the production cycle, and, after having been preheated with superheated auxiliary gas, for instance, air, it is sprayed into the highly heated reactor III. Sulfur oxides are split off and sodium sulfate is formed, which drops to the bottom as solid salt. There it is dissolved, if desired, with addition of an inblown cooling gas, by the melt (e.g. of alkali metal bisulfate) passing through and is returned into the process by pipe 38a. The lower part of the wall of the reactor III is sprayed in order to prevent formation of sodium sulfate deposits.

With reference to FIG. 2, an advantageous method will now be described, wherein alkali metal bisulfate is used as a carrier medium in the cycle. In this case, the cycle passes through the evaporator tower 12a and over pipe 32 and 34a into the two reactors I and IIa. From there it passes through pipe 28a and 48a, respectively, to reactor III, where it dissolves the sodium sulfate which has formed and returns by way of 28b to the evaporator 12a. In order that total decomposition may occur, a partial stream is branched off from IIa over pipe 48a, said partial stream corresponding to the ammonium sulfate used at the start. In reactor IIb sodium pyrosulfate is formed from the sodium sulfate which is conveyed over pipe 48a into reactor III, where it is converted into solid sulfate with splitting off of sulfur oxides. Ammonia is withdrawn over pipes 42 and 44a, $SO_3$ over pipe 46a, and water through pipe 44b. The whole system is heated by combustion gas generated in combustion chamber 16 from where the gases are conveyed over pipelines 14a to 14e to the different reactors and the evaporator 12a.

Of the several possible units of equipment we should like to mention the Cowper. The reactor III comprises a Cowper couple, each unit being alternately heated to the required reaction temperature by the combustion gases of chamber 16. After a temperature of about 1,000 to 1,200° C. is reached in one unit, spraying and rinsing is done as described, until the lower temperature limit is reached, whereupon the second Cowper unit is put into action, which unit has been preheated to high temperature in the meanwhile.

The method of operation according to B appears to be more advantageous. In this method, the introduced ammonium sulfate is converted to ammonium bisulfate in reactor I, and ammonium bisulfate is then used as carrier medium, and is returned into evaporator 12. This is the first cycle. In the second cycle, the amount of bisulfate which corresponds to the conversion of ammonium sulfate is continuously circulated, where it is converted in reactors II and III to sodium sulfate. Since, consequently, only a part of the total circulated pyrosulfate is decomposed to sulfate, the melt remains liquid and thus makes possible the continuous return of sodium sulfate into the reactor II. In continuous operation, the percentage of conversion can be so adjusted by choosing the temperature and the period of stay, that the whole process is in equilibrium.

The reactors are preferably made of high temperature resistant and oxidation-proof material and the units are heated indirectly. As mentioned before, the melt is preferably fed from bottom to top through the reactor in the application of the mammoth pump principle, e.g. through heated bundles of tubes.

Another embodiment contemplates arranging the melt to flow down over baffle plates or cascades which may be heated and which meet superheated gases or air in countercurrent thereto. The entire heat consumption is provided for by the combustion of oil, gas, or the like fuel, in the combustion chamber. As variations, we mention the Cowper heating which requires combustion gases; sometimes superheated air is also required. The fact that the combustion gases are made to pass in countercurrent to the course of the process, that is to say, from higher to lower unit temperature, makes it possible that very favorable results are achieved.

Since it is important for the purity of the final products ammonia and sulfur oxides to have a high temperature gradient between the splitting stages, catalysts are preferably used in order to be able to check the course of the reaction and to provide a sharp demarcation between the several reaction stages.

Ammonia will be obtained in different concentrations in the several stages. This is to say, toward the end of the splitting, the water content will rise. Depending on the desired use, the several fractions can be collected and condensed together or separately.

It is possible to collect at least part of the bisulfate water separately. In any case, the bisulfate has to be split to such an extent before entering reactor III, that the sulfur oxides will be as water-free as possible.

With the high decomposition temperatures of the pyrosulfate, there will occur a considerable decomposition of sulfur trioxide to sulfur dioxide and oxygen. Sulfur trioxide is preferably isolated by absorption in concentrated sulfuric acid or in its combination with trioxide. The dioxide remaining in the residuary gas, may, for instance, be recovered by rinsing with aqueous ammonia in the form of ammonium bisulfite.

In case a higher amount of sulfur dioxide is desired for further processing, it is possible to reduce the gases, e.g. with sulfur or another reducing agent in a zone provided for that purpose in reactor III, so that a proper ratio of the two sulfur oxides may be obtained.

Due to the high temperature of the melt, part of the pyrosulfate is carried along as sublimate when sulfur oxides are split off. For the separation of trioxide there are several possibilities. For instance, the sublimate can be rinsed out by use of one of the salt melts, e.g. ammonium bisulfate which is conveyed from reactor I to reactor II. For this purpose, a suitably equipped washing tower 26 is placed into the route of the reaction products, where the sublimate is introduced over pipe 30, and the gaseous $SO_3$ is withdrawn over line 46. In another embodiment, the pyrosulfate mist may be absorbed by means of oleum which is arranged ahead of the main absorption of $SO_3$. After the oleum is saturated with pyrosulfate it may be regenerated by distillation; or after the trioxide is driven off, it can be neutralized and returned into the process.

In case that aqueous fractions of the product gases are to be dehydrated, the circulating melts can be used for that purpose in a certain stage and with proper temperatures, without being taken out of the circulation. This can likewise be achieved by arrangement of a suitable rinsing unit in the circulation system.

Example

An about 50 percent by weight ammonium sulfate liquor obtained as a by-product in a chemical synthesis of organic compounds is continuously introduced by spraying into the bottom of evaporator tower 12 by way of line 10; the tower is continuously passed through by an ammonium bisulfate melt. At the same time, combustion gas from combustion chamber 16 is passed through pipe line 14d, the temperature of which has been lowered to approximately 250 to 300° C. by heat exchange, during the several stages of the process. Before the gas enters the tower 12, air is admitted to such an extent that the temperature will not be decreased below about 230° C.

The flow in the tower is maintained by the arrangement of a nozzle-like equipment at the bottom which moves the melt and the liquor from the bottom by means of the combustion gases thrusting them toward the top—similar to an air lift pump. At the top, the mass will be allowed to settle down in a separate zone, and steam will be separated and carried off by the combustion gas, while part of the melt is passed through line 32 into the reactor I. Another part is carried back through the tower 12 to the nozzles at the bottom. The ratio of melt passed through the tower and the liquor introduced therein is about 5:1, so that the total evaporation of the water and the simultaneous dissolution of ammonium sulfate in bisulfate is promoted due to the additional inner cycle.

In this manner, with an hourly input of 1 ton 48% ammonium sulfate liquor, an approximately anhydrous melt will arrive in the reactor in about the same period, containing 470 kgs. ammonium sulfate dissolved in about 5,000 kgs. of ammonium bisulfate. The residual water amounts to about 2 to 10 kgs. per hour during the several periods of operation, in dependence on the varying temperature of the heating gases and leads to a corresponding decrease of the ammonia concentration in the gas escaping from reactor I through pipe 42.

The hot combustion gases charged with steam are used to a large extent for heating and overheating the incoming ammonium sulfate liquor, which is brought to highest temperature in the pressure pipeline 10 and then continuously released in the mixing nozzles of the evaporator tower 12.

In the reactor I, the mixture of ammonium sulfate and bisulfate is heated to about 320° C., and is made to flow in a downward current, in such a manner that no entering product can mix with the discharge product. Temperature and period of stay are so adjusted that almost all the ammonium sulfate is converted into bisulfate with ammonia being split off. Unreacted portions are returned with the circulating melt over line 28, into the tower 12. Ammonia escaping from line 42 is carried off and condensed. In this reaction stage, 54.9 kgs. ammonia per hour are recovered with about 5 kgs. of water.

The heating of the reactor I occurs indirectly by combustion gas over pipeline 14c before the gas enters tower 12.

From reactor I, part of ammonium bisulfate is continuously withdrawn for further processing which has been newly formed from the ammonium sulfate. That is to say, 377 kgs. ammonium bisulfate are hourly introduced with about 38 kgs. unreacted ammonium sulfate into reactor II by way of line 34.

Reactor II serves for splitting off the remaining bound ammonia at temperatures raised to about 500° C. For this purpose, the ammonium bisulfate is introduced in a circulating stream of excess sodium pyrosulfate over line 36, which contains at least the amount of sodium sulfate necessary for splitting off the ammonia. After ammonium bisulfate has been reacted with sodium sulfate, to form sodium bisulfate and ammonia, the high temperature prevailing will be sufficient to convert the sodium bisulfate into pyrosulfate with water being split off. While this reaction occurs, a continuous flow of gas will escape from reactor II amounting to 63.7 kilograms ammonia and 64 kgs. steam which are condensed simultaneously over line 44. If desired, the operation can be so effected that an essential separation of ammonia from the reaction water will occur.

Since it has proved advantageous to work with excess sodium sulfate, the pyrosulfate melt hourly introduced into reactor II will be made to contain per about 4,000 kgs. of pyrosulfate about 1,000 kgs. sodium sulfate, of which 505 kgs. are hourly converted in the reactor II. The remainder is carried along in the pyrosulfate cycle.

Due to the splitting off of water from the sodium bisulfate formed in the reactor II, the pyrosulfate amount in the cycle is hourly increased by 787 kgs. From this amount, the sulfur oxides are split off in the reactor III with formation of sodium sulfate. This happens by introducing the effluent from reactor II over line 38 into reactor III, where a bundle of tubes is heated to a temperature of 900° C. The melt is forcefully carried toward the top while sulfur oxides are split off; after the mass has calmed down on top, the gaseous products are separated. Part of the melt is made to return through gravity tubes lying outside of the combustion chamber to the nozzles at the entrance; this means that the period of stay is extended by the formation of an inner cycle. Simultaneously, a portion which corresponds to the outer cycle is returned over line 38a to reactor II, taking along the amount of sodium sulfate formed by the splitting off of sulfur oxides. The heating of the reactors is brought about indirectly by means of the combustion gases from chamber 16 over lines 14a and 14b, in the direction over reactor III to reactor II. Additional heat exchangers are arranged between the two reactors for adjustment of the temperature differential in the cycles.

From the reactor III, a gas mixture is recovered in a continuous stream, which contains in addition to some air, which was added at the entrance into the nozzles to improve the flow conditions, sulfur trioxide with some percentage of sulfur dioxide.

Since the sulfur oxides escaping from reactor III carry along varying amounts of pyrosulfate as vapor and mist—about 20–40 kgs. per hour—there is another rinsing aggregate 26 arranged ahead of the trioxide absorption into which the sulfur oxides-containing gases are supplied over line 36 for total removal of the pyrosulfate. It is advantageous to arrange the aggregate between reactors I and II, where an intensive countercurrent washing action with bisulfate will effect a thorough cleansing, the bisulfate being passed through line 34. In this manner, the absorbed pyrosulfate is returned to reactor II.

The entire amount obtained per hour is 275 kgs. calculated as trioxide. This trioxide is absorbed by concentrated sulfuric acid in a known manner in a wash tower equipped with the necessary cooling devices, whereby oleum is formed. From the residuous gas, dioxide is converted with aqueous ammonia to ammonium bisulfate.

What is claimed is:

1. A process for obtaining ammonia and sulfur oxides from ammonium sulfate liquors by a splitting process with alkali sulfate forming as intermediate products alkali bisulfate and alkalipyrosulfate, which comprises circulating salt melts through three different reaction systems; said first system consisting chiefly of ammonium bisulfate into which dehydrated ammonium sulfate is introduced and wherein at a temperature of about 300° C. ammonium sulfate is converted into ammonium bisulfate, thereby splitting off not more than 50% by weight of ammonia;

passing part of the ammonium bisulfate melt to a second reaction system which chiefly consists of alkalipyrosulfate and alkalisulfate, the melt from the first system there being converted at about 500° C. with alkali sulfate to alkalipyrosulfate with splitting off of further ammonia;

further passing part of the melt from the second system which chiefly consists of alkalipyrosulfate to said third system where at about 900° C. the alkalipyrosulfate is converted into alkali sulfate with simultaneous splitting off of sulfur oxides, one part of said melt being recycled into the second system.

2. The process as set forth in claim 1, which comprises the step of dehydrating ammonium sulfate in the presence of ammonium bisulfate and introducing it into the first system where it forms a melt with the ammonium bisulfate.

3. The process as set forth in claim 1, wherein the maintenance of the temperatures for the different splitting reactions is effected by passing hot gases through the melts.

4. The process as set forth in claim 1, wherein the circulation of the salt melts is effected in the reaction systems by means of gas being thrust upwardly according to the principle of the mammoth pump.

5. The process as set forth in claim 1, wherein the split-off gases are freed from entrained salt mist by rinsing with alkali pyrosulfate, alkali bisulfate or ammonium bisulfate melt.

6. The process as set forth in claim 1, wherein the temperatures of the splitting reactions are reduced by employing catalysts in the reactions.

References Cited by the Examiner

UNITED STATES PATENTS

| | | | |
|---|---|---|---|
| 1,255,474 | 2/1918 | Sherwood | 23—174 |
| 1,313,192 | 8/1919 | Kee | 23—121 |
| 2,442,874 | 6/1948 | Kamlet | 23—121 |
| 2,899,277 | 8/1959 | Holowaty | 23—119 |

FOREIGN PATENTS 128,302   6/1919   Great Britain.

OSCAR R. VERTIZ, *Primary Examiner.*

BENJAMIN HENKIN, MAURICE A. BRINDISI,
*Examiners.*

R. M. DAVIDSON, *Assistant Examiner.*